(12) United States Patent
Tai et al.

(10) Patent No.: US 12,254,125 B2
(45) Date of Patent: Mar. 18, 2025

(54) INTEGRATED CIRCUIT APPLICABLE TO PERFORMING SYSTEM PROTECTION THROUGH DYNAMIC VOLTAGE CHANGE

(71) Applicant: Realtek Semiconductor Corp., HsinChu (TW)

(72) Inventors: Chang-Hsien Tai, HsinChu (TW); Chia-Chu Cho, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 478 days.

(21) Appl. No.: 17/546,061

(22) Filed: Dec. 9, 2021

(65) Prior Publication Data

US 2022/0222385 A1    Jul. 14, 2022

(30) Foreign Application Priority Data

Jan. 8, 2021   (TW) .................................. 110100703

(51) Int. Cl.
  *G06F 21/75*      (2013.01)
  *G01R 31/317*   (2006.01)
  (Continued)

(52) U.S. Cl.
  CPC ..... *G06F 21/755* (2017.08); *G01R 31/31719* (2013.01); *G06F 21/554* (2013.01);
  (Continued)

(58) Field of Classification Search
  CPC .......... G06F 21/755; G06F 1/329; G06F 1/26; G06F 1/324; G06F 21/554; G06F 21/56;
  (Continued)

(56) References Cited

U.S. PATENT DOCUMENTS

| 8,120,952 B2 | 2/2012 | Han |
| 2015/0121519 A1* | 4/2015 | Hauke ................... G06F 21/755 726/22 |

(Continued)

FOREIGN PATENT DOCUMENTS

| CN | 104283673 A | | 1/2015 |
| TW | I285307 B | * | 3/2005 |
| TW | 202029039 A | | 8/2020 |

OTHER PUBLICATIONS

David et al., "Memory Power Management via Dynamic Voltage/Frequency Scaling", ICAC 2011, Jun. 14-18, 2011, ACM, USA, Jun. 14, 2011.

*Primary Examiner* — Kyung H Shin
(74) *Attorney, Agent, or Firm* — Winston Hsu

(57) ABSTRACT

An integrated circuit (IC) applicable to performing system protection through dynamic voltage change may include a monitoring circuit, at least one power voltage generation circuit and a voltage adjustment circuit. The monitoring circuit monitors at least one security checking result of a security engine to determine whether at least one security event occurs. The at least one power voltage generation circuit generates at least one internal power voltage within the IC according to at least one input voltage received from outside of the IC, to provide the internal power voltage to at least one internal component of the IC. In response to occurrence of the at least one security event, the voltage adjustment circuit controls the at least one power voltage generation circuit to dynamically adjust the at least one internal power voltage, to control the internal power voltage randomly exceed predetermined voltage range thereof, thereby performing the system protection.

10 Claims, 6 Drawing Sheets

(51) Int. Cl.
  *G06F 21/55* (2013.01)
  *G06F 21/79* (2013.01)
  *G11C 29/00* (2006.01)
  *H01J 49/10* (2006.01)

(52) U.S. Cl.
  CPC .............. *G06F 21/79* (2013.01); *G11C 29/00* (2013.01); *H01J 49/107* (2013.01)

(58) Field of Classification Search
  CPC ....... G06F 21/552; H01J 49/107; H01J 49/24; H01J 49/0095; H01J 49/0031; H01J 49/26
  See application file for complete search history.

(56) References Cited

U.S. PATENT DOCUMENTS

2017/0098534 A1* 4/2017 Brown ................... H01J 49/107
2019/0108332 A1* 4/2019 Glew .................... G06F 21/554

* cited by examiner

INTEGRATED CIRCUIT APPLICABLE TO PERFORMING SYSTEM PROTECTION THROUGH DYNAMIC VOLTAGE CHANGE

BACKGROUND OF THE INVENTION

1. Field of the Invention

The present invention is related to system protection, and more particularly, to an integrated circuit applicable to performing a system protection through a dynamic voltage change.

2. Description of the Prior Art

An electronic device may encounter certain types of attacks. For example, a hacker may replace a non-volatile memory of the electronic device (e.g. a flash memory, and more particularly, original firmware code therein) with another non-volatile memory (e.g. another flash memory, and more particularly, malicious firmware code therein), or download malicious software code to an internal memory of the electronic device, for performing illegal activities. According to related technologies, the electronic device can be equipped with certain protection mechanisms (e.g. intentional misconnection of the hardware interface, change of packet content corresponding to a random number, and encryption/decryption) to counter the above attacks and protect the system of the electronic device. However, certain problems may still occur. For example, since such protection mechanisms are typically based on complex combinations, the hacker may try to crack through trial and error of various combinations, which means that he/she may successfully crack the system at last. Therefore, there is a need for a novel method and related architecture to implement an electronic device having a reliable protection mechanism without side effects or with less likelihood of causing side effects.

SUMMARY OF THE INVENTION

It is an objective of the present invention to provide an integrated circuit applicable to performing a system protection through a dynamic voltage change, in order to solve the above-mentioned problems.

It is another objective of the present invention to provide an integrated circuit applicable to performing a system protection through a dynamic voltage change, in order to ensure normal operations of the electronic device.

At least one embodiment of the present invention provides an integrated circuit, which is applicable to performing a system protection through a dynamic voltage change. The integrated circuit can comprise a monitoring circuit, at least one power voltage generation circuit, and a voltage adjustment circuit coupled to the monitoring circuit and the at least one power voltage generation circuit. The monitoring circuit can be arranged to monitor at least one security checking result of a security engine to determine whether at least one security event occurs; the at least one power voltage generation circuit can be arranged to generate at least one internal power voltage within the integrated circuit according to at least one input voltage received from outside of the integrated circuit, to provide the at least one internal power voltage to at least one internal component of the integrated circuit; and the voltage adjustment circuit can be arranged to control the at least one power voltage generation circuit to dynamically adjust the at least one internal power voltage in response to occurrence of the at least one security event, to control the at least one internal power voltage randomly exceed a predetermined voltage range thereof, thereby disturbing the occurrence of the at least one security event to perform the system protection.

One of the benefits of the present invention is that, through a carefully designed power voltage adjustment mechanism, the present invention can generate a voltage change that the hacker cannot predict in response to the above attacks, and more particularly, by changing one or more voltages of one or more terminals of a certain component such as a memory (e.g. a non-volatile memory outside the integrated circuit, such as a flash memory; or an internal memory of the integrated circuit), the present invention can make the execution of hacker's malicious code generate inconsistent execution results, which is difficult to determine whether the attack is successful or not, thus lessening the hacker's willpower for attacking.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
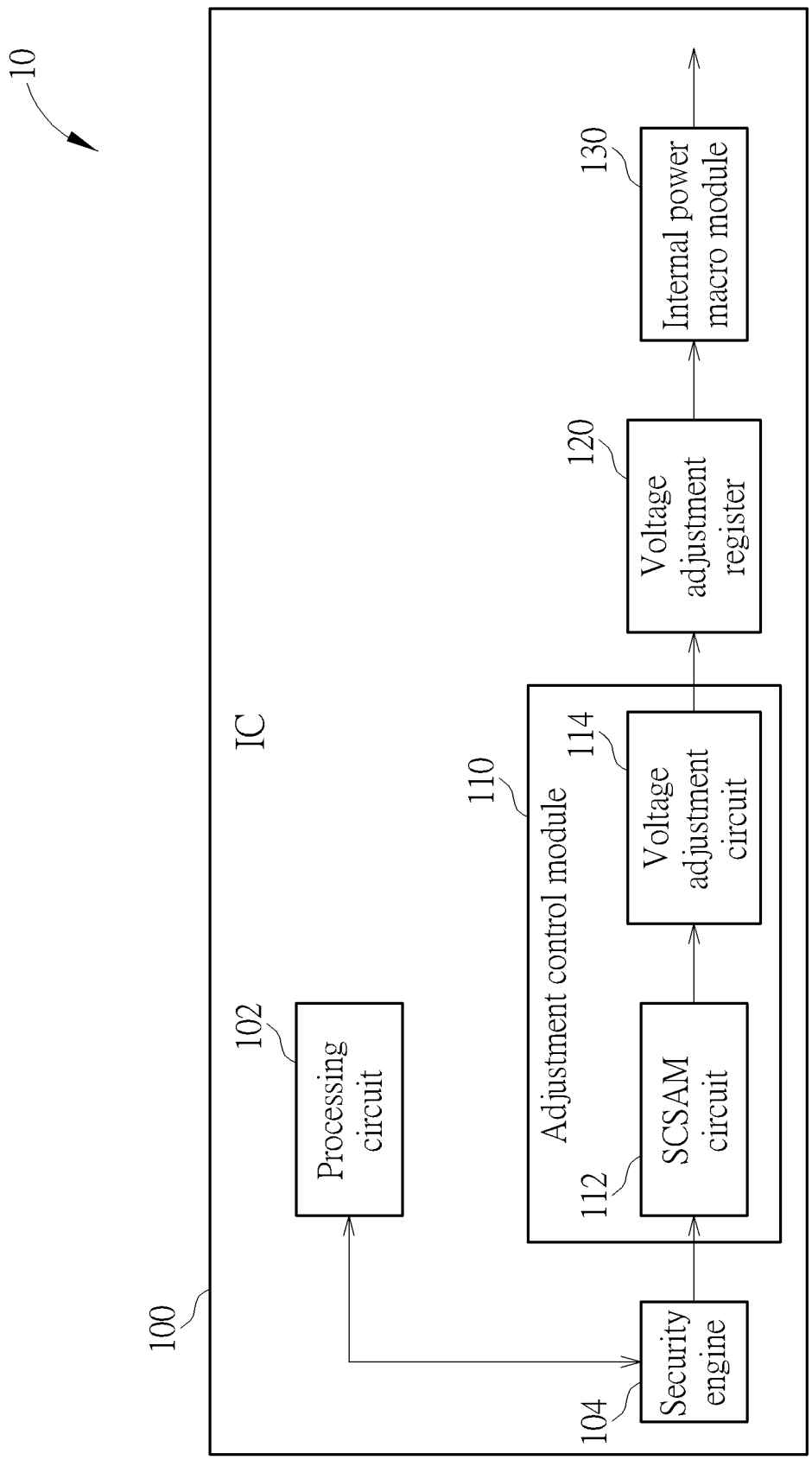
FIG. 1 is a diagram illustrating an integrated circuit applicable to performing a system protection through a dynamic voltage change according to an embodiment of the present invention, wherein the integrated circuit can be placed inside an electronic device.

FIG. 1 is a diagram illustrating an integrated circuit(IC) 100 applicable to performing a system protection through a dynamic voltage change according to an embodiment of the present invention, wherein the IC 100 can be placed inside an electronic device 10, and more particularly, may be mounted on a main circuit board (e.g. a printed circuit board), but the present invention is not limited thereto. The IC 100 may comprise a processing circuit 102, a security engine 104, an adjustment control module 110, and at least one voltage adjustment register (e.g. one or more voltage adjustment registers), which may be collectively referred to as a voltage adjustment register 120, and may further comprise at least one power voltage generation circuit (e.g. one or more power voltage generation circuits) corresponding to the at least one voltage adjustment register, such as at least one internal power macro module (e.g. one or more internal power macro modules), which may be collectively referred to as an internal power macro module 130, wherein the adjustment control module 110 may comprise a monitoring circuit such as a security checking and sensitive address monitoring circuit 112 (for brevity, labeled as "SCSAM circuit") and a voltage adjustment circuit 114. The processing circuit 102 may be configured to control operations of the electronic device 10, the security engine 104 may be configured to perform security checking, and the adjustment control module 110 may be configured to perform control of the power voltage adjustment, and more particularly, to control the at least one power voltage generation circuit (e.g. the internal power macro module 130) to perform adjustment of the power voltage through the at least one voltage adjustment register (e.g. the voltage adjustment register 120).

In the architecture shown in FIG. 1, the monitoring circuit, such as the security checking and sensitive address monitoring circuit 112, may monitor at least one security checking result of the security engine 104 in the IC 100 to determine whether at least one security event (e.g. a security event caused by malicious code) occurs. For example, the security engine 104 may perform at least one operation of security checking on information processed by the IC 100 (e.g. the processing circuit 102), such as instructions or data, accessed by the IC 100 (e.g. the processing circuit 102) in a storage device (e.g. a memory which is not shown in FIG. 1), to generate the at least one security checking result. The output signal of the security engine 104 may carry the at least one security checking result, and the monitoring circuit (e.g. the security checking and sensitive address monitoring circuit 112) may obtain the at least one security checking result through the output signal of the security engine 104. More particularly, when any security checking result of the at least one security result indicates that the security checking fails, it is determined that the at least one security event occurs, but the present invention is not limited thereto. In some embodiments, the monitoring circuit (e.g. the security checking and sensitive address monitoring circuit 112) may be integrated in the security engine 104. In this case, the monitoring circuit may directly obtain the at least one security checking result without via the aforementioned output signal. In some embodiments, the security engine 104 may be implemented by software/hardware/firmware in the pertinent field that is applicable to performing checking operations, report operations, counter operations, etc., on various security events, but the present invention is not limited thereto.

In the case where the monitoring circuit is implemented by the security checking and sensitive address monitoring circuit 112, the monitoring circuit (e.g. the security checking and sensitive address monitoring circuit 112) may be further configured to monitor one or more sensitive addresses, such as one or more addresses of one or more protected storage areas in the storage device (e.g. the memory), for determining whether the at least one security event occurs. An example of the one or more protected storage areas may comprise, but not limited thereto, a system area arranged to store system information of the IC 100. When any sensitive address of the one or more sensitive addresses is accessed (e.g. read or written), the security checking and sensitive address monitoring circuit 112 may determine that the at least one security event occurs.

In addition, the at least one power voltage generation circuit (e.g. the internal power macro module 130) may generate at least one internal power voltage according to at least one input voltage received from outside of the IC 100, to provide power to at least one internal component of the IC 100 (e.g. a storage device or the processing circuit 102). In response to occurrence of the at least one security event, the voltage adjustment circuit 114 may control the at least one power voltage generation circuit (e.g. the internal power macro module 130) to dynamically adjust the at least one internal power voltage, to make the at least one internal power voltage randomly exceed a predetermined voltage range thereof, thereby performing the system protection. For example, in response to the occurrence of the at least one security event, the monitoring circuit (e.g. the security checking and sensitive address monitoring circuit 112) may trigger the voltage adjustment circuit 114 to start performing the system protection, and more particularly, dynamically adjusting the at least one internal power voltage. Since the at least one internal power voltage randomly exceeds the predetermined voltage range thereof, the entire system becomes unstable, which may cause great troubles for the hacker.

For example, the IC 100 may be equipped with one or more types of protection mechanisms, such as intentional misconnection of a hardware interface, change of packet content corresponding to a random number, encryption/decryption, or a combination thereof, for performing a basic protection. In a condition that the power voltage adjustment mechanism in the architecture of the present invention randomly makes the entire system become unstable, it may cause the feedback value of the hacker's malicious code (e.g. malicious software code or malicious firmware comprising attack commands or operational commands) to become unstable. The hacker may mistakenly believe that he/she has succeeded in the attack at some point in time, but at a certain point in time, an error may occur again. The hacker will eventually find out that the execution of the malicious code produces a right execution result and a wrong execution result that occur alternatingly (e.g. sometimes the execution result of the same malicious code meets the hacker's expectation, and sometimes the execution result does not meet the hacker's expectation). Since the execution results are inconsistent and the time and value of the error occurrence have no specific patterns because of the randomness, the hacker or the malicious code thereof is forced to be in a dilemma where the effectiveness of the attack cannot be recognized (e.g. regarding a protection mechanism based on a complex combination, the hacker may try to crack the system protection through trial and error of various combinations, but because of the randomness of the system protection, it is difficult for the hacker to predict the results), thereby reducing the willingness of the hacker to continue attacking.

In the above-mentioned embodiment, the processing circuit 102 may be implemented by one or more processors (e.g. central processing unit(s), or micro control unit(s)), one or more logic circuits, etc., and the security engine 104 may be implemented by a security engine circuit. In addition, the internal power macro module 130 may be implemented by a voltage regulator, a low dropout regulator (LDO regulator), etc. For example, any power voltage generation circuit (e.g. any internal power macro module) of the at least one power voltage generation circuit (e.g. the internal power macro module 130) may comprise one or more voltage regulators and/or one or more LDO regulators. In addition, the at least one voltage adjustment register (e.g. the voltage adjustment register 120) may store at least one register value, to control the at least one power voltage generation circuit (e.g. the internal power macro module 130) for generating the at least one internal power voltage corresponding to the at least one register value. As a result, in response to occurrence of at least one security event, the voltage adjustment circuit 114 may control the at least one power voltage generation circuit (e.g. the internal power macro module 130) by adjusting the at least one register value, to dynamically adjust the at least one internal power voltage for making the at least one internal power voltage randomly exceed the predetermined voltage range thereof, thereby performing the system protection.

TABLE 1

| Register value | Voltage(V) |
|---|---|
| 4'd15 | *1.96* |
| 4'd14 | *1.94* |
| 4'd13 | *1.92* |
| 4'd12 | *1.90* |
| 4'd11 | 1.88 |
| 4'd10 | 1.86 |
| 4'd9 | 1.84 |
| 4'd8 | 1.82 |
| 4'd7 | 1.80 |
| 4'd6 | 1.78 |
| 4'd5 | 1.76 |

Table 1 illustrates any register value (e.g. each register value) of the at least one register value and the internal power voltage corresponding to said any register value (for brevity, labeled as "Voltage" in Table 1), wherein the register value may be represented by four bits (for brevity, labeled as "4'") and may be any integer of the integers in the interval [0, 15] (e.g. any value of the values d0, d1 . . . and d15, and the prefix d thereof represents a decimal numeral system), and the internal power voltage may be represented in volt (V) and may vary within the range from 1.66 (V) to 1.96 (V) (i.e. voltage randomness), but the present invention is not limited thereto. According to some embodiments, the bit count of the register value, the range of the register value, the unit of the internal power voltage, and/or the range of the internal power voltage may be changed.

For better comprehension, the predetermined voltage range of the internal power voltage may represent an operating voltage range of the IC 100, such as a range of the interval [Vmin, Vmax]. For example, Vmin=1.72 (V) and Vmax=1.88 (V). In this situation, the voltages in italics in Table 1, such as 1.66 (V) to 1.70 (V) and 1.90 (V) to 1.96 (V), may represent examples of voltage levels exceeding the predetermined voltage range, and the voltages in bold in Table 1, such as 1.78 (V) to 1.82 (V), may represent better operating voltages, wherein 1.80 (V) may represent the best operating voltage. It is understood that the better operating voltages do not limit the IC 100 to only operate within this voltage range, and the internal power voltage may change due to various factors (e.g. temperature). In some embodiments, the values of the predetermined voltage range of the internal power voltage are all operating voltage values that the IC 100 may tolerate and do not affect the operation of the IC 100, but the voltage values are not limited to the values in the embodiments.

According to some embodiments, any power voltage generating circuit of the above-mentioned power voltage generating circuits (e.g. any internal power macro module of the above-mentioned internal power macro modules), such as a certain internal power macro module in the internal power macro module 130, may comprise a set of regulators and one or more switching circuits (e.g. one or more switches) for generating the internal power voltage corresponding to any register value of the above-mentioned register values. The set of regulators may respectively generate multiple candidate internal power voltages (e.g. the candidate internal power voltages 1.66-1.96 (V) respectively corresponding to multiple candidate register values 4'd0-4'd15 in Table 1), and according to a current register value (e.g. a certain candidate register value among the multiple candidate register values 4'd0-4'd15), the one or more switching circuits may select a corresponding internal power voltage outputted by a certain regulator of the set of regulators (e.g. a certain candidate internal power voltage of the candidate internal power voltages 1.66-1.96 (V)) as the internal power voltage corresponding to any register value of the above-mentioned register values, wherein the set of regulators may be implemented by voltage regulators, LDO regulators, etc., but the present invention is not limited thereto.

Figure 2:
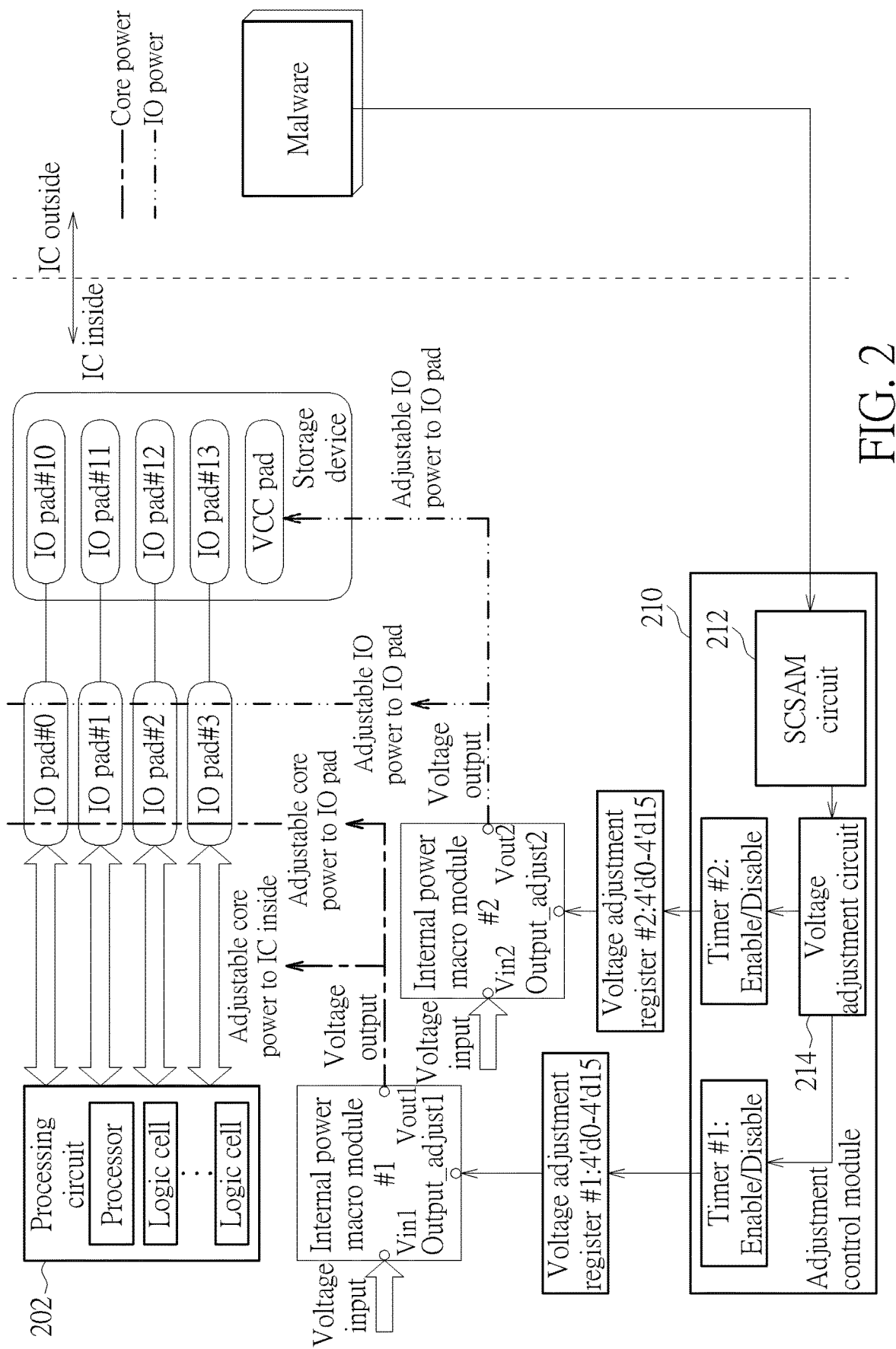
FIG. 2 illustrates a first control scheme of a method for performing a system protection through a dynamic voltage change according to an embodiment of the present invention, wherein the method can be applicable to the integrated circuit shown in FIG. 1.

FIG. 2 illustrates a first control scheme of a method for performing a system protection through a dynamic voltage change according to an embodiment of the present invention, wherein the method may be applicable to the IC 100 shown in FIG. 1. For better comprehension, two ends of a vertical dotted line are respectively labeled as "IC inside" and "IC outside" to indicate the inside and outside of the IC 100 in the electronic device 10, and an arrow pointing from the box labeled as "Malware" to the inside of the IC represents that the malware (which can be taken as an example of the malicious code) from a hacker triggers the occurrence of the at least one security event. A processing circuit 202 may be taken as an example of the above-mentioned processing circuit 102, and more particularly, the processing circuit 202 may comprise at least one processor, multiple logic cells, etc. In addition, an adjustment control module 210 and a security checking and sensitive address monitoring circuit 212 (for brevity, labeled as "SCSAM circuit") and a voltage adjustment circuit 114 therein may be taken as examples of the adjustment control module 110, the security checking and sensitive address monitoring circuit 112, and the voltage adjustment circuit 114, respectively. A voltage adjustment register #1, a voltage adjustment register #2, etc. may be examples of the above-mentioned at least one voltage adjustment register (e.g. the voltage adjustment register 120), and an internal power macro module #1, an internal power macro module #2, etc. may be examples of the above-mentioned at least one internal power macro module (e.g. the internal power macro module 130).

According to this embodiment, the adjustment control module 210 may comprise at least one timer (e.g. a timer #1 and a timer #2), and is arranged to refer to the settings of the security checking and sensitive address monitoring circuit 212, to selectively enable or disable the voltage adjustment (labeled as "Enable/Disable" for brevity), and more particularly, to enable/disable the control paths from the voltage adjustment circuit 214 to the voltage adjustment register #1, the voltage adjustment register #2, etc. for continuing/pausing the change of the respective register values of the voltage adjustment registers #1, the voltage adjustment register #2, etc. that are made by the voltage adjustment circuit 214, wherein the enabling time or the disabling time may be regular or irregular (i.e. the time randomness) to increase the complexity of dynamic voltage change, but the present invention is not limited thereto. In some embodiments, the above-mentioned at least one timer may be integrated in the voltage adjustment circuit 214. In addition, under the control of the adjustment control module 210 (e.g. the voltage adjustment circuit 214 therein), the respective register values of the voltage adjustment registers #1, the voltage adjustment registers #2, etc. may vary within the range of the multiple candidate register values 4'd0-4'd15 (labeled as "4'd0-4'd15" for brevity), and the internal power macro module #1, the internal power macro module #2, etc. may receive the respective register values of the voltage adjustment registers #1, the voltage adjustment registers #2, etc. through an output adjustment terminal Output_adjust1 thereof, an output adjustment terminal Output_adjust2 thereof, etc., respectively, to generate the internal power voltages respectively corresponding to these register values (labeled as "Voltage output" for brevity) according to the aforementioned at least one input voltage of an input terminal Vin1, an input terminal Vin2, etc. (labeled as "Voltage input" for brevity), where the internal power voltages may be output through an output terminal Vout1, an output terminal Vout2, etc., respectively. In some embodiments, the voltage adjustment circuit 214 may switch the changes of the register values of the voltage adjustment registers #1 and the voltage adjustment registers #2 through the cooperative operation of a timer and/or other randomness control logic, to implement randomness of voltage control of the adjustment circuit 214.

As shown in FIG. 2, the at least one internal power voltage may comprise an adjustable core power voltage transmitted toward the inside of the IC 100 such as the processing circuit 202 (labeled as "Adjustable core power to IC inside" for brevity), an adjustable core power voltage transmitted toward at least one input/output pad (abbreviated as "IO pad") in the IC 100 such as an IO pad #0, an IO pad #1, an IO pad #2, and an IO pad #3 (labeled as "Adjustable core power to IO pad" for brevity), and an adjustable input/output power (abbreviated as "IO power") voltage transmitted toward at least one IO pad in the IC 100 such as the IO pad #0, the IO pad #1, the IO pad #2, and the IO pad #3 (labeled as "Adjustable IO power to IO pad" for brevity). More particularly, the at least one internal power voltage may further comprise an adjustable IO power voltage transmitted toward at least one IO pad (e.g. an IO pad #10, an IO pad #11, an IO pad #12, and an IO pad #13) of the storage device such as the memory (e.g. an adjustable IO power voltage transmitted toward a power voltage pad such as a VCC pad next to the IO pad #10, the IO pad #11, the IO pad #12, and the IO pad #13), wherein the adjustable IO power voltage is labeled as "Adjustable IO power to IO pad" for brevity. In some embodiments, the voltage value of the core power is substantially lower than the voltage value of the IO power. For brevity, similar description of this embodiment will not be repeated here.

Figure 3:
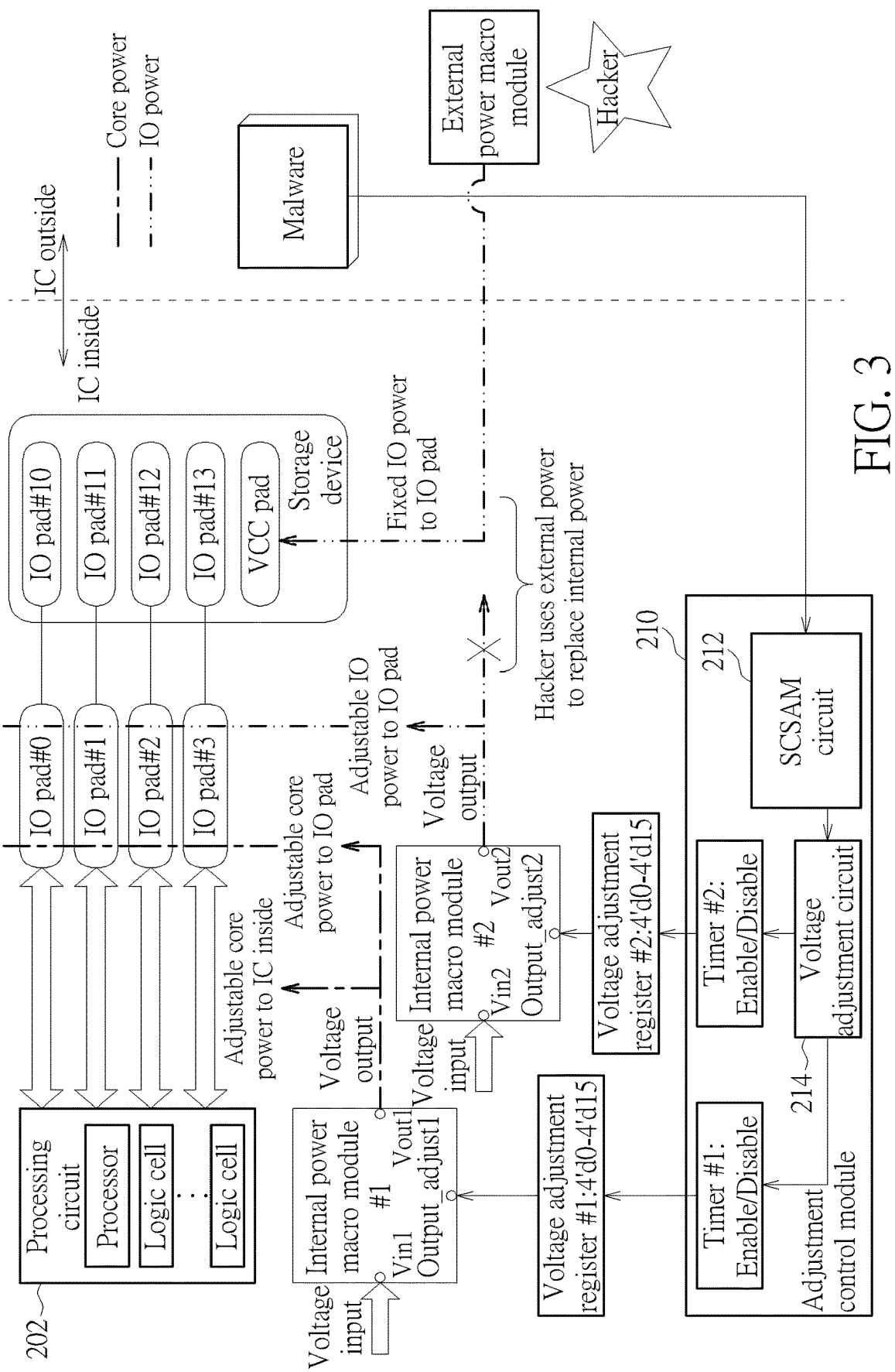
FIG. 3 illustrates a second control scheme of the method according to an embodiment of the present invention.

FIG. 3 illustrates a second control scheme of the method according to an embodiment of the present invention. Compared to the architecture shown in FIG. 2, the architecture shown in FIG. 3 has a modified circuit of the adjustable IO power voltage of the VCC pad transmitted to the storage device that is controlled by a hacker (which belongs to a common attack mode, but the present invention is not limited thereto). For example, the hacker may use an external power (e.g. an external power macro module) to replace the internal power for providing voltage to the VCC pad of the storage device. As shown in FIG. 3, since the at least one internal power voltage may comprise multiple adjustable power voltages (e.g. one "adjustable core power to IO pad" and another "adjustable core power to IO pad" transmitted to the IO pad #0, the IO pad #1, the IO pad #2, and the IO pad #3). Therefore, the hacker cannot successfully crack the protection mechanism of the system through only controlling the voltage of the VCC pad. For brevity, similar description of this embodiment will not be repeated here.

Figure 4:
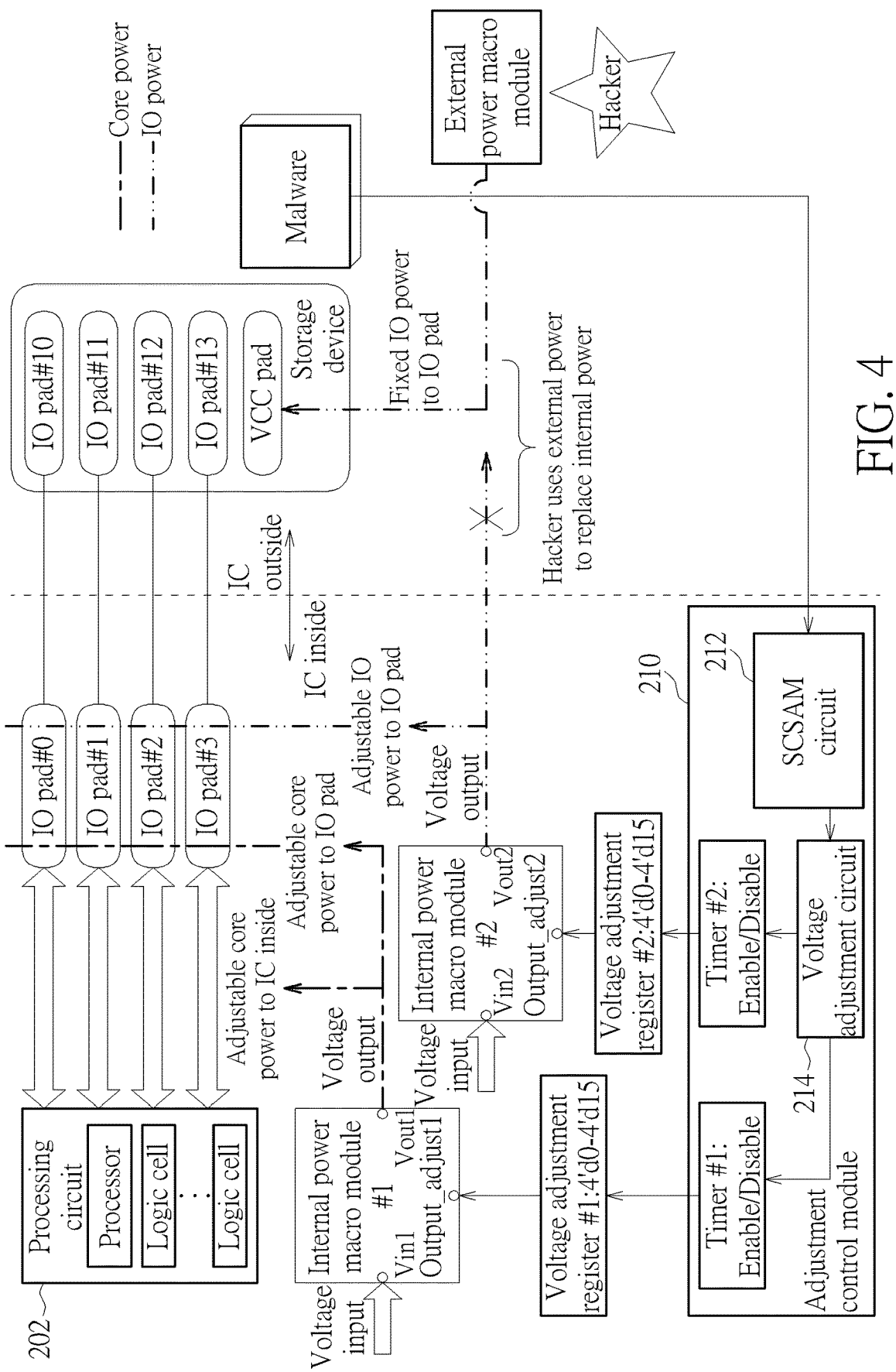
FIG. 4 illustrates a third control scheme of the method according to an embodiment of the present invention.

FIG. 4 illustrates a third control scheme of the method according to an embodiment of the present invention. Compared to the architecture shown in FIG. 3, the architecture shown in FIG. 4 has the storage device (e.g. the memory) at a different location. More particularly, the storage device is disposed outside the IC 100, such as being mounted on the main circuit board (e.g. the printed circuit board). Similarly, as shown in FIG. 4, the at least one internal power voltage comprises multiple adjustable power voltages. Therefore, the hacker cannot successfully crack the protection mechanism of the system through only controlling the voltage of the VCC pad. For brevity, similar description of this embodiment will not be repeated here.

Figure 5:
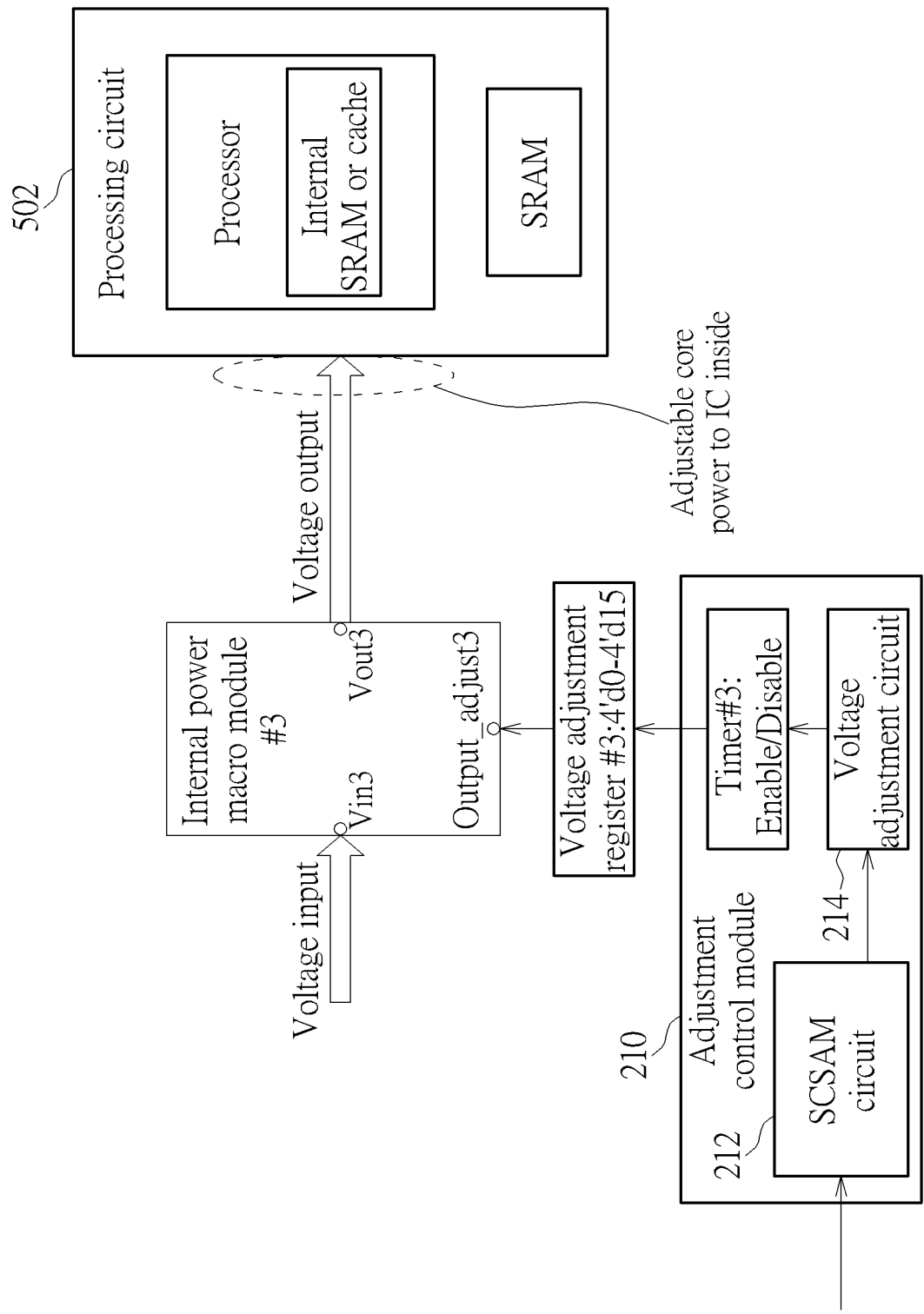
FIG. 5 illustrates a fourth control scheme of the method according to an embodiment of the present invention.

FIG. 5 illustrates a fourth control scheme of the method according to an embodiment of the present invention. A processing circuit 502 may be taken as an example of the above-mentioned processing circuit 102, and may also be taken as an example of the above-mentioned processing circuit 202. An adjustment control module 201 may comprise the above-mentioned at least one timer (e.g. the timer #1, the timer #2, and the timer #3), and more particularly, the voltage adjustment register #1, the voltage adjustment register #2, the voltage adjustment register #3, etc. may be taken as examples of the above-mentioned at least one voltage adjustment register (e.g. the voltage adjustment register 120), and the internal power macro module #1, the internal power macro module #2, the internal power macro module #3, etc. may be taken as examples of the above-mentioned at least one internal power macro module (e.g. the internal power macro module 130), wherein the architecture shown in FIG. 1 may be implemented according to at least one of the embodiments shown in FIGS. 2-4 and the embodiment shown in FIG. 5. The processing circuit 502 may comprise the above-mentioned at least one processor, the multiple logic units (not shown in FIG. 5), and a static random access memory (SRAM), and the above-mentioned at least one processor may comprise an internal SRAM or a cache memory (labeled as "Internal SRAM or cache" for brevity).

According to the embodiment, the timer #3 of the above-mentioned at least one timer may selectively enable or disable the voltage adjustment (labeled as "Enable/Disable" for brevity) according to the setting of the security checking and sensitive address monitoring circuit 212. More particularly, the timer #3 may enable/disable the control path from the voltage adjustment circuit 214 to the voltage adjustment register #3 for continuing/pausing the change of the register value of the voltage adjustment register #3 that is made by the voltage adjustment circuit 214, wherein the enabling time or the disabling time may be regular or irregular to increase the complexity of dynamic voltage change, but the present invention is not limited thereto. In addition, under the control of the adjustment control module 210 (e.g. the voltage adjustment circuit 214), the register value of the voltage adjustment register #3 may vary within the range of the multiple candidate register values 4'd0-4'd15 (labeled as "4'd0-4'd15" for brevity), and the internal power macro module #3 may receive the register value of the voltage adjustment register #3 through an output adjustment terminal Output_adjust3 thereof, to generate the internal power voltage corresponding to the register value (labeled as "Voltage output" for brevity) according to the input voltage of an input terminal Vin3 (labeled as "Voltage input" for brevity), where the internal power voltage is output through an output terminal Vout3. For brevity, similar description of this embodiment will not be repeated here.

Figure 6:
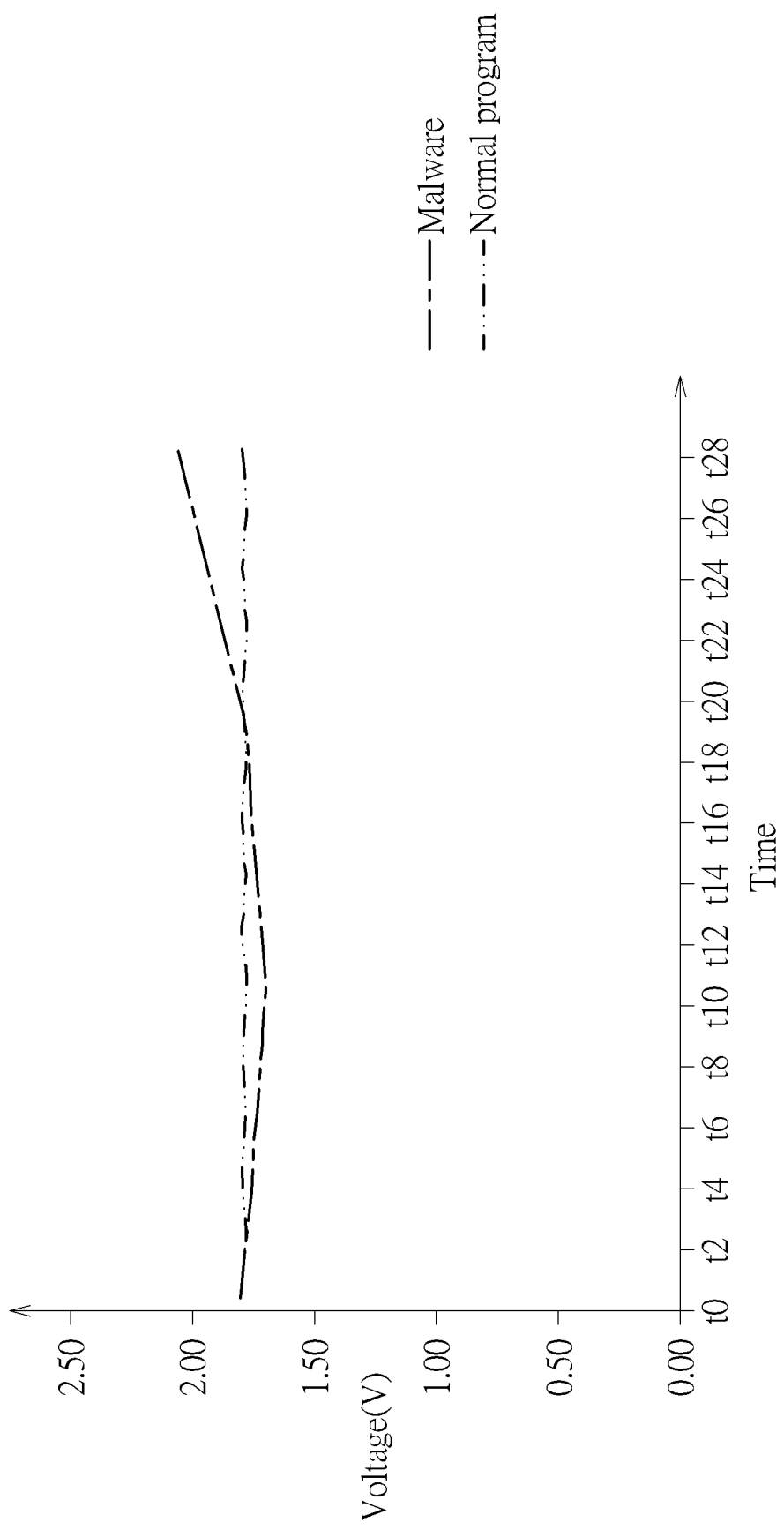
FIG. 6 illustrates an example of a dynamic voltage change according to an embodiment of the present invention.

FIG. 6 illustrates an example of a dynamic voltage change according to an embodiment of the present invention. The horizontal axis may represent time, and the vertical axis may represent the internal power voltage corresponding to said any register value (labeled as "Voltage" for brevity), wherein the time points {t0, t2, . . . , t28, . . . } may represent the sampling time points, but the present invention is not limited thereto. When the processing circuit 102 (e.g. the processor therein) is running a normal program (e.g. the program provided by the manufacturer of the IC 100, the program provided by the customer of the manufacturer, or the user program of the IC 100), the IC 100 may control the internal power voltage to maintain a stable voltage level (e.g. the better operating voltages in Table 1, such as 1.78 (V) to 1.82 (V)). When the processing circuit 102 (e.g. the processor therein) is running a malicious program such as the malware (e.g. when the security engine 104 determines that the at least one security event occurs), the IC 100 may control the internal power voltage to randomly exceed the predetermined voltage range thereof, thereby performing the system protection. The aforementioned embodiments for implementing voltage randomness and time randomness are all examples and not intended to limit the present invention. For brevity, similar description of this embodiment will not be repeated here.

As mentioned above, generally speaking, the IC 100 may operate within a better operating voltage range, but the voltage value fluctuates slightly due to various factors (e.g. temperature). In some embodiments of the present invention, when a security event occurs, the operating voltage range of the IC 100 will vary greatly and randomly (but generally does not affect the operation of the IC 100), which is intended to cause the hacker's malicious code to generate unexpected feedback, thereby disrupting the attack willingness of the hacker. Such a dynamic voltage change is a mechanism to protect the IC 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit, applicable to performing a system protection through a dynamic voltage change, the integrated circuit comprising:
    a monitoring circuit, arranged to monitor at least one security checking result of a security engine to determine whether at least one security event occurs;
    at least one power voltage generation circuit, arranged to generate at least one internal power voltage within the integrated circuit according to at least one input voltage received from outside of the integrated circuit, to provide the at least one internal power voltage to at least one internal component of the integrated circuit during a normal operating state;
    a voltage adjustment circuit, coupled to the monitoring circuit and the at least one power voltage generation circuit, wherein in response to occurrence of the at least one security event, the voltage adjustment circuit is arranged to control the at least one power voltage generation circuit to dynamically adjust the at least one internal power voltage, to control the at least one internal power voltage to randomly exceed a predetermined voltage range thereof to cause the integrated circuit to enter an unstable operating state, thereby disturbing the occurrence of the at least one security event to perform the system protection, the voltage adjustment circuit comprising:
    a timer for enabling and disabling the dynamic adjustment of the at least one internal power voltage.

2. The integrated circuit of claim 1, further comprising:
    at least one voltage adjustment register, coupled between the voltage adjustment circuit and the at least one power voltage generation circuit, and arranged to store at least one register value to control the at least one power voltage generation circuit, in order to generate the at least one internal power voltage corresponding to the at least one register value.

3. The integrated circuit of claim 2, wherein in response to the occurrence of the at least one security event, the voltage adjustment circuit controls the at least one power voltage generation circuit by adjusting the at least one register value, to dynamically adjust the at least one internal power voltage for controlling the at least one internal power voltage to randomly exceed the predetermined voltage range thereof.

4. The integrated circuit of claim 1, wherein any power voltage generation circuit within the at least one power voltage generation circuit comprises one or more voltage regulators.

5. The integrated circuit of claim 1, wherein any power voltage generation circuit within the at least one power voltage generation circuit comprises one or more low dropout regulators.

6. The integrated circuit of claim 1, wherein the at least one internal power voltage comprises an adjustable core power voltage transmitted toward the interior of the integrated circuit.

7. The integrated circuit of claim 1, wherein the at least one internal power voltage comprises an adjustable core power voltage transmitted toward at least one input/output (IO) pad within the integrated circuit.

8. The integrated circuit of claim 1, wherein the at least one internal power voltage comprises an adjustable input/output (IO) power voltage transmitted toward at least one IO pad within the integrated circuit.

9. The integrated circuit of claim 1, wherein the monitoring circuit is integrated into the security engine.

10. The integrated circuit of claim 1, wherein the monitoring circuit is implemented as a security checking and sensitive address monitoring circuit, and is further configured to monitor one or more sensitive addresses, in order to determine whether the at least one security event occurs, where when any sensitive address of the one or more sensitive addresses is accessed, the security checking and sensitive address monitoring circuit determines the at least one security event occurs.

* * * * *